(12) United States Patent
Kishiyama et al.

(10) Patent No.: US 8,422,355 B2
(45) Date of Patent: Apr. 16, 2013

(54) MOBILE COMMUNICATION SYSTEM, BASE STATION APPARATUS, USER APPARATUS AND METHOD

(75) Inventors: Yoshihisa Kishiyama, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 557 days.

(21) Appl. No.: 12/601,840

(22) PCT Filed: May 21, 2008

(86) PCT No.: PCT/JP2008/059329
§ 371 (c)(1),
(2), (4) Date: Mar. 23, 2010

(87) PCT Pub. No.: WO2008/146673
PCT Pub. Date: Dec. 4, 2008

(65) Prior Publication Data
US 2010/0177688 A1 Jul. 15, 2010

(30) Foreign Application Priority Data
May 25, 2007 (JP) .................................. 2007-139719

(51) Int. Cl.
*H04J 11/00* (2006.01)
(52) U.S. Cl.
USPC .......................................................... 370/208
(58) Field of Classification Search .................. None
See application file for complete search history.

(56) References Cited

U.S. PATENT DOCUMENTS 5,867,478 A * 2/1999 Baum et al. ................. 370/203
2007/0104174 A1 * 5/2007 Nystrom et al. ............. 370/343
2008/0285534 A1 * 11/2008 Dent ............................. 370/342

FOREIGN PATENT DOCUMENTS

JP 2007-89113 A 4/2007
JP 2008-118310 A 5/2008

OTHER PUBLICATIONS

Patent Abstracts of Japan, Publication No. 2007-089113, dated Apr. 5, 2007, 1 page.
Patent Abstracts of Japan, Publication No. 2008-118310, dated May 22, 2008, 1 page.
3GPP TS 25.211 V3.12.0, Sep. 2002, 5.3.3.1 Common Pilot Channel (CPICH), pp. 24-25, 2 pages.
3GPP TSG RAN WG1 Meeting #46, R1-062100, Tallinn, Estonia, Aug. 28-Sep. 1, 2006, "Orthogonal Reference Signal Design in E-UTRA Downlink," 6 pages.
International Search Report issued in PCT/JP2008/059329, mailed on Sep. 2, 2008, w/translation, 7 pages.
Written Opinion issued in PCT/JP2008/059329, mailed on Sep. 2, 2008, 3 pages.

* cited by examiner

*Primary Examiner* — Anh-Vu Ly
(74) *Attorney, Agent, or Firm* — Osha Liang LLP

(57) ABSTRACT

A base station apparatus for use in a mobile communication system includes: a unit configured to generate a reference signal; a unit configured to generate a transmission symbol including the reference signal; a unit configured to transmit the transmission symbol for each sector; and a unit configured to monitor a radio propagation state. The reference signal is generated by multiplying a first sequence formed by a non-orthogonal code sequence which is different at least between an adjacent cell and an own cell, by a second sequence. Whether to form the second sequence by using an orthogonal code sequence which is different among sectors or by using a non-orthogonal code sequence is determined according to the radio propagation state.

21 Claims, 15 Drawing Sheets

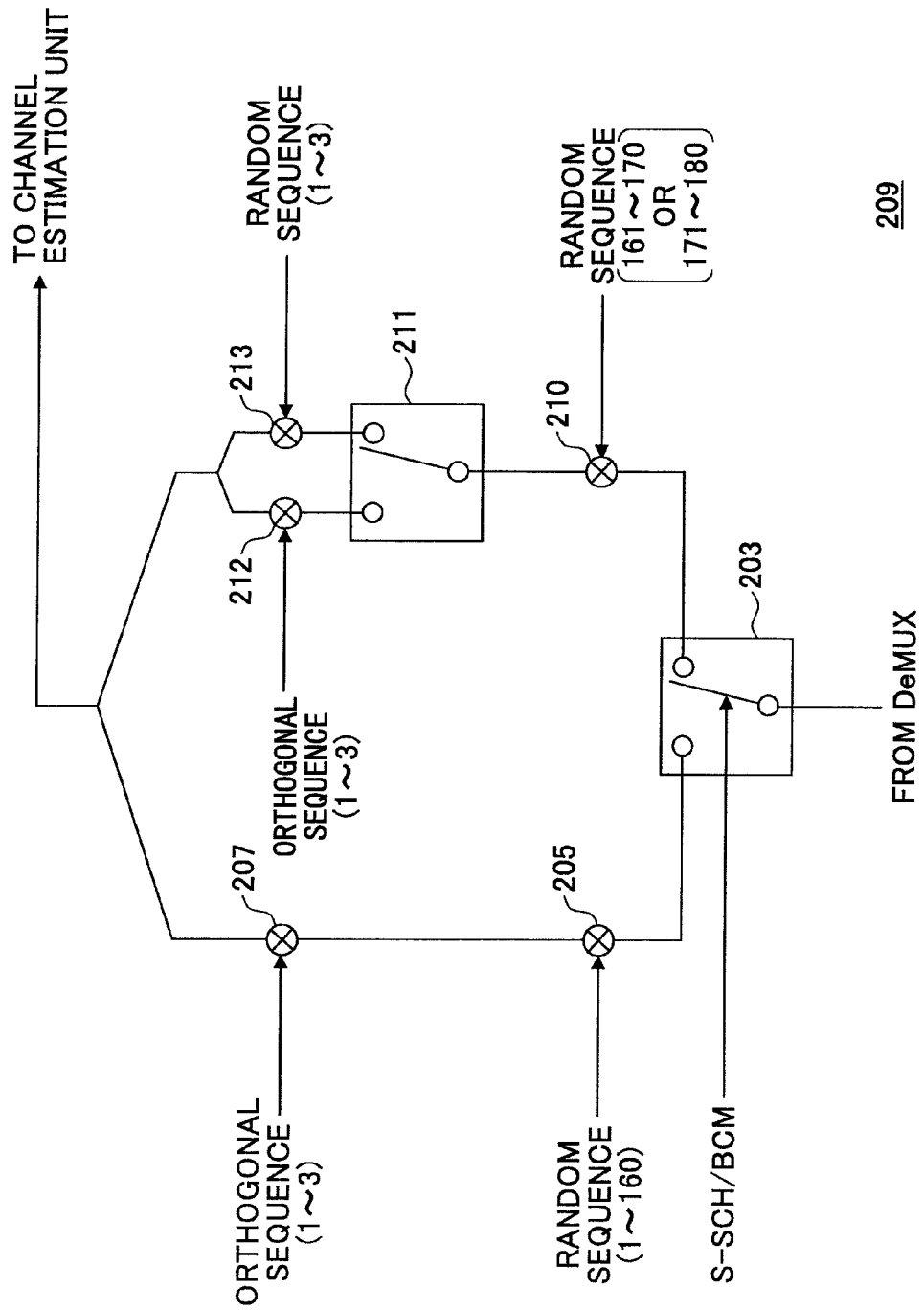

MOBILE COMMUNICATION SYSTEM, BASE STATION APPARATUS, USER APPARATUS AND METHOD

TECHNICAL FIELD

The present invention generally relates to a technical field of mobile communications. More particularly, the present invention relates to a mobile communication system, a base station apparatus, a user apparatus and a method when transmitting a downlink reference signal.

BACKGROUND ART

In the mobile communication system, a reference signal is used for various purposes such as channel estimation, synchronization acquisition, cell search, reception quality measurement and the like. The reference signal is a signal in which values of bits are known in the transmission side and in the reception side before communication, and the reference signal may be referred to as a known signal, a pilot signal, a training signal and the like. It is desirable that the reference signal corresponds one-to-one with a cell ID for identifying a cell. Thus, a large number of reference signals need to be prepared. In the existing system of the Wideband Code Division Multiple Access (W-CDMA) scheme, 512 kinds of reference signals (code sequences) are prepared for the downlink (refer to non-patent document 1, for example).

In the system of the W-CDMA scheme, every reference signal is formed by a random sequence. Correlation between the sequences may become relatively large, but, it dose not come to a large issue since signal quality is ensured mainly by the power in the CDMA based system.

However, in the future mobile communication system planning to perform downlink communication of the OFDM (orthogonal frequency division multiplexing) scheme by using a band wider than that of the present system of the W-CDMA scheme, it is desired to largely suppress other-cell interference. If every reference signal is prepared using the random code sequence like the present system of the W-CDMA scheme, other-cell interference becomes relatively large.

As shown in FIG. 1, from the viewpoint of suppressing interference among cells or among sectors, it is proposed to configure the reference signal by a first sequence formed by a random code sequence and a second sequence which belongs to an orthogonal code sequence group (refer to non-patent document 2, for example). In this proposal, orthogonal code sequences which are different with other are used in a plurality of sectors belonging to the same cell, and random code sequences are used among cells.

FIG. 2 shows relationship among reference signals, cells and sectors. For the sake of simplifying the explanation, although "sectors" are described as a plurality of areas belonging to the same cell, the distinction between "cell" and "sector" is not necessarily strict, and they may be used as equivalent terms as long as there is no fear of confusion. Although three cells and nine sectors in the cells are described as representatives for the sake of simplicity of drawing, similar description applies to other cells and sectors.

In this example, the reference signal is prepared by multiplying a reference sequence by a random code sequence (first sequence) and an orthogonal code sequence (second sequence). A cell identifier (cell ID) for identifying a cell corresponds one-to-one with the reference signal, and the cell identifiers can be prepared by the number of combinations of the random code sequences and the orthogonal code sequences. For example, if 170 random code sequences and 3 orthogonal code sequences are prepared, 510 reference signals and cell IDs can be prepared in total. In the figure, different patterns of the cells correspond to random code sequences which are different with each other for the cells. The symbols "a, b, c" represent 3 orthogonal code sequences which are selected from a orthogonal code sequence group.

Although every cell commonly use a, b and c for its sectors, since random code sequences which are different with each other are used in the cells, the reference signals are different for each sector as a whole. Since sectors included in the same cell are synchronized with each other, interference among sectors can be reduced to substantially 0 by using the orthogonal codes a, b and c. Generally, cell are not synchronized with each other. Thus, interference may remain to some extent. But, since inter-sector interference in the same cell becomes substantially 0, the whole interference amount is small.

FIG. 3 shows a concrete example and a mapping example of the orthogonal code sequence. In the example shown in the figure, a sequence group including three orthogonal code sequences of (1,1,1), (1, exp(j2π/3), exp(j4π/3)) and (1, exp(j4π/3), exp(j2π/3)) is used, so that orthogonalization among three sectors is performed. In the mapping example shown in FIG. 3, a mapping method is devised such that orthogonality can be sufficiently achieved. The reference signal is mapped to time and frequency as shown in the figure, and the reference signal is multiplied by the random code sequence and the orthogonal code sequence. One subframe includes seven symbol durations. The subframe may be referred to as TTI: Transmission Time Interval, and it may be 1.0 ms, for example.

A plurality of frequency components of the reference signal which are transmitted at the same time during a symbol duration have components of phase angles which are different with each other by nθ (integral multiple of θ). Components which are transmitted during different symbol durations in a same subframe include components of phase angles different with each other by (φ+nθ). In the first sector, θ=0 and φ=0 are assigned. In the second sector, θ=exp(j2π/3) and φ=exp(j4π/3) are assigned. In the third sector, θ=exp(j4π/3) and φ=exp(j2π/3) are assigned. When the reference signal is mapped as shown in the figure, every combination of 3 components enclosed by a frame of the case 1, case 2 and case 3 form one orthogonal code sequence.

FIG. 4 shows a mapping example similar to the example of FIG. 3. Moreover, FIG. 4 concretely shows each component $c_{1j}$ (j=1, 2, 3) of the random code sequence and each component (1, exp(j2π/3), exp(j4π/3)) of the orthogonal code sequence to be applied to the reference signal. It is assumed that the random code sequence in the first cell (41 in FIG. 2, for example) is ($c_{11}$, $c_{12}$, $c_{13}$), the random code sequence in the second cell (42 in FIG. 2, for example) is ($c_{21}$, $c_{22}$, $c_{23}$) and that the random code sequence in the third cell (43 in FIG. 2, for example) is ($c_{31}$, $c_{32}$, $c_{33}$). FIG. 4 shows reference signals transmitted in sectors #1, #2 and #3 respectively in the first cell. In any combination of two sectors, the inner product (correlation) among 3 components in the frames of the cases 1, 2 and 3 becomes 0. Therefore, from the viewpoint of enhancing estimation accuracy of the reference signal, it is preferable to use sequences which are orthogonal among sectors as the reference signal.

[Non-patent document 1] 3GPP, TS25.211 "Physical Channels and mapping of transport channels onto physical channels (FDD)"

[Non-patent document 2] 3GPP, R1-062100, NTT DoCoMo, Fujitsu, KDDI, Mitsubishi Electric, NEC, Panasonic, Sharp, Toshiba Corporation, "Orthogonal Reference Signal Design in E-UTRA Downlink"

DISCLOSURE OF THE INVENTION

Problem to be Solved by the Invention

By the way, under multipath propagation environment, a plurality of coming waves (paths) arrive at the receiver over a time period. The time period is also called delay spread. In an area in which the cell radius is small or in an urban area and the like, the delay spread is relatively small. However, on the other hand, the delay spread becomes large in an area in which the cell radius is large, in a suburban area, in a basin and the like. When the delay spread becomes large, amplitude and phase may largely vary among paths due to frequency selective fading. When phase rotation angle becomes inaccurate due to fading, orthogonality is largely deteriorated, so that there is a fear that channel estimation accuracy based on the reference signal is largely deteriorated. Especially when the orthogonal sequence is represented by the phase rotation sequence as mentioned above, it is not preferable that the phase rotation angle becomes inaccurate.

An object of the present invention is to be able to receive the reference signal transmitted from each of sectors belonging to the same base station with high quality even in an area where path delay spread is large.

Means for Solving the Problem

In a first embodiment of the present invention, a base station apparatus for use in a mobile communication system is used. The base station apparatus includes: a unit configured to generate a reference signal; a unit configured to generate a transmission symbol including the reference signal; a unit configured to transmit the transmission symbol for each sector; and a unit configured to monitor a radio propagation state. The reference signal is generated by multiplying a first sequence formed by a non-orthogonal code sequence which is different at least between an adjacent cell and an own cell, by a second sequence. Whether to form the second sequence by using an orthogonal code sequence which is different among sectors or by using a non-orthogonal code sequence is determined according to the radio propagation state.

In a second embodiment of the present invention, a base station apparatus for use in a mobile communication system is used. The base station apparatus includes: a unit configured to generate a reference signal; a unit configured to generate a transmission symbol including the reference signal; a unit configured to transmit the transmission symbol for each sector; and a unit configured to monitor a radio propagation state. It is determined according to a radio propagation state whether to generate the reference signal using a first configuration method or using a second configuration method. In the first configuration method, the reference signal is generated by multiplying a non-orthogonal code sequence which is different at least between an adjacent cell and an own cell by an orthogonal code sequence which is different among sectors. In the second configuration method, the reference signal is generated by multiplying a non-orthogonal code sequence which is different among sectors by an orthogonal code sequence which is different among sectors in order to configure the reference signal.

In a third embodiment of the present invention, a mobile communication system including a plurality of base station apparatuses is used. Each base station apparatus includes: a unit configured to generate a reference signal; a unit configured to generate a transmission symbol including the reference signal; and a unit configured to transmit the transmission symbol for each sector. In equal to or more than one base station apparatus, the reference signal is generated by multiplying a first sequence formed by a non-orthogonal code sequence which is different at least between an adjacent cell and an own cell, by a second sequence formed by an orthogonal code sequence different among sectors. In other equal to or more than one base station apparatus, the reference signal is generated by multiplying a first sequence formed by a non-orthogonal code sequence which is different at least between an adjacent cell and an own cell, by a second sequence formed by a non-orthogonal code sequence different among sectors.

In a fourth embodiment of the present invention, a mobile communication system including a plurality of base station apparatuses is used. Each base station apparatus includes: a unit configured to generate a reference signal; a unit configured to generate a transmission symbol including the reference signal; and a unit configured to transmit the transmission symbol for each sector. In equal to or more than one base station apparatus, the reference signal is generated by multiplying a first sequence formed by a non-orthogonal code sequence which is different at least between an adjacent cell and an own cell, by a second sequence formed by an orthogonal code sequence which is different among sectors. In other equal to or more than one base station apparatus, the reference signal is generated by multiplying a first sequence formed by a non-orthogonal code sequence which is different at least between an adjacent cell and an own cell, by a second sequence, wherein whether to form the second sequence by using an orthogonal code sequence which is different among sectors or by using a non-orthogonal code sequence is determined according to a radio propagation state.

Effect of the Present Invention

According to the present invention, it becomes possible to receive the reference signal transmitted from each of sectors belonging to the same base station with high quality even in an area where path delay spread is large.

BRIEF DESCRIPTION OF THE DRAWINGS

FIG. 16 is a diagram showing the reference signal restoring unit of the user apparatus used in the fourth embodiment.

Figure 1:
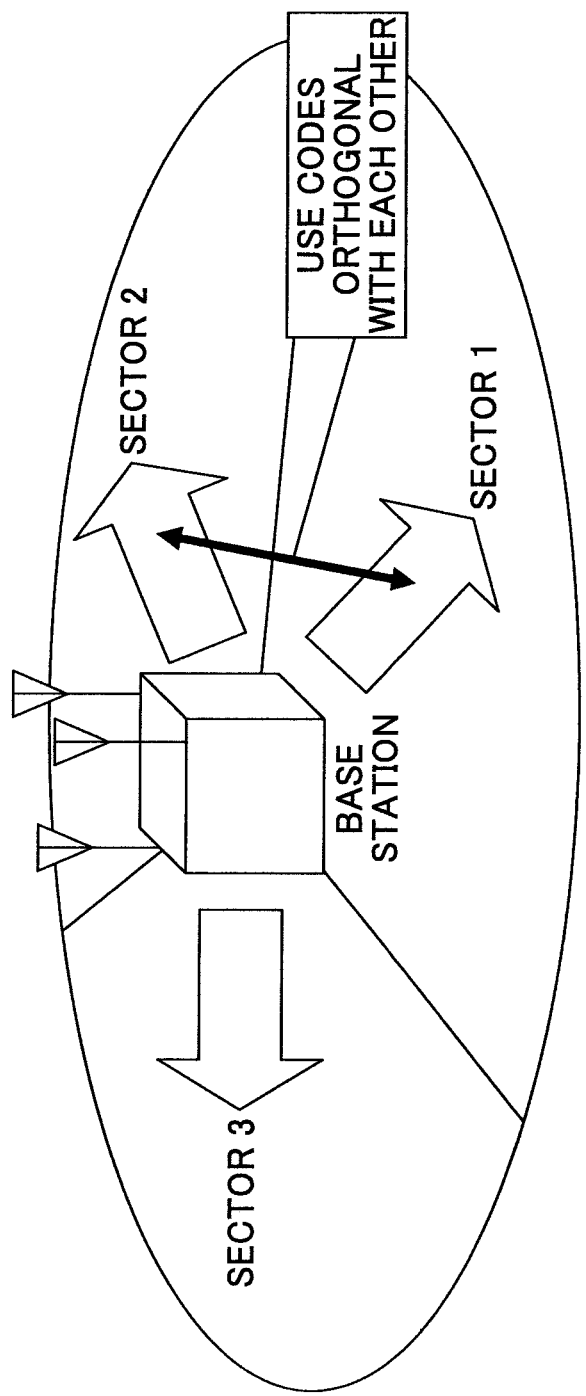
FIG. 1 is a conceptual diagram of a mobile communication system.
Figure 2:
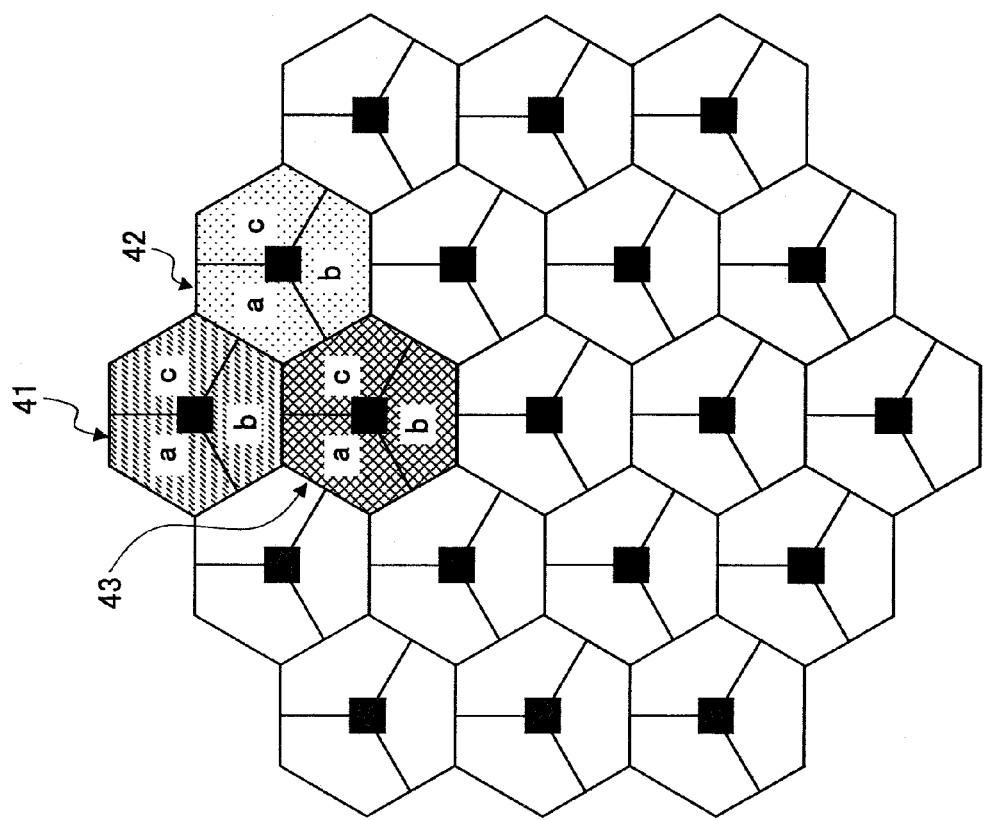
FIG. 2 is a diagram showing relationship among cells, sectors and reference signals.
Figure 3:
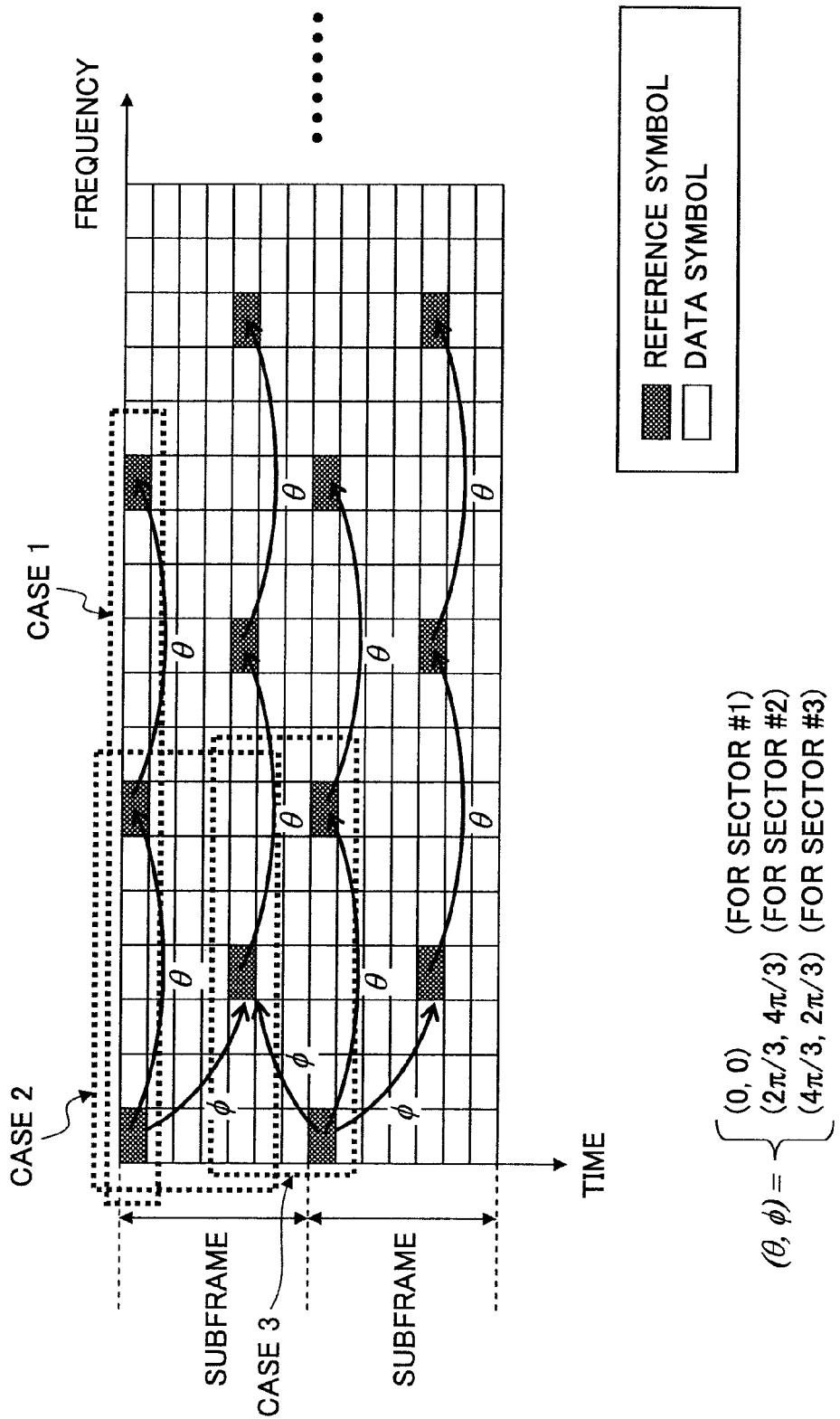
FIG. 3 is a diagram showing a mapping example of the reference signal.
Figure 4:
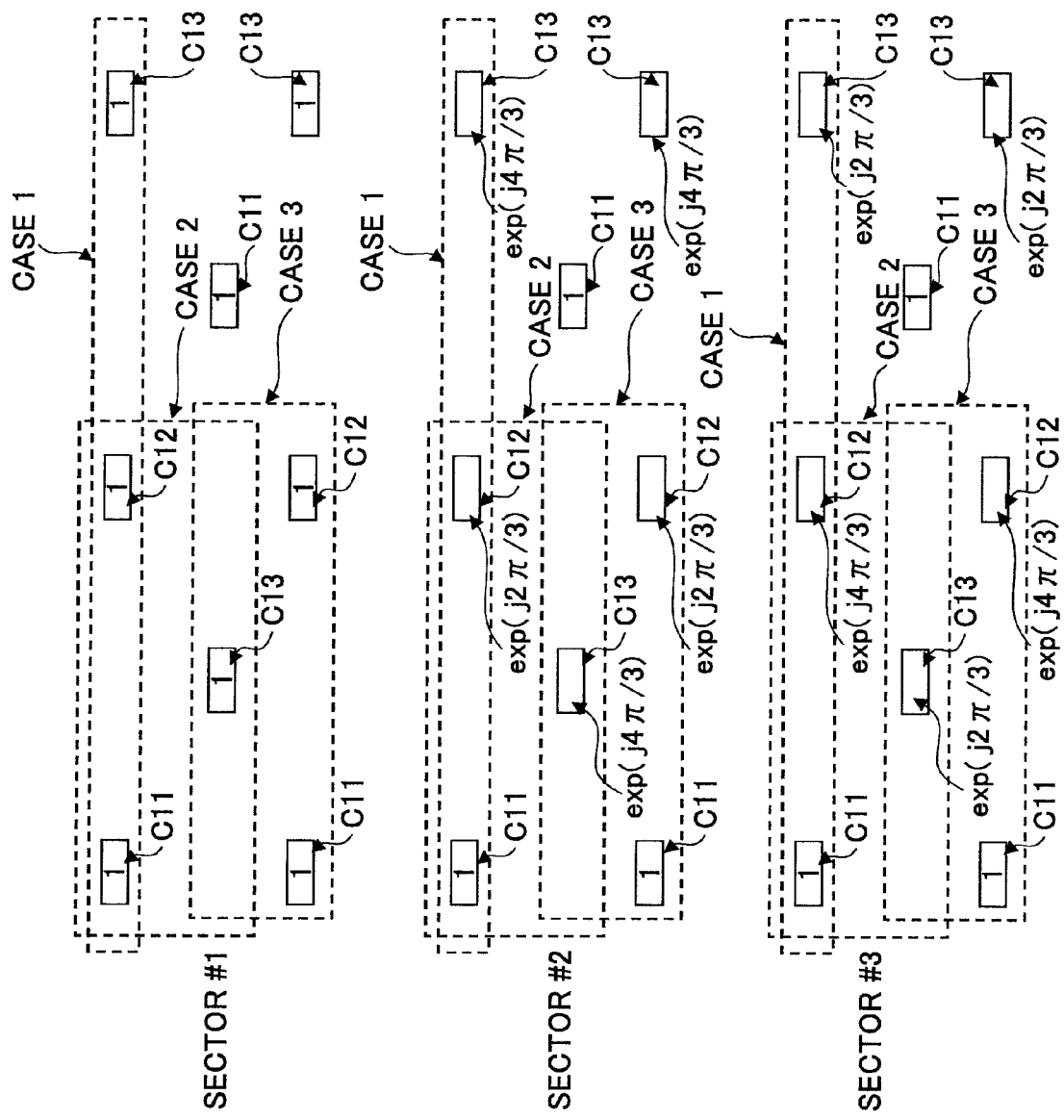
FIG. 4 is a diagram showing the reference signal transmitted from each sector.

DESCRIPTION OF REFERENCE SIGNS 12 unicast data processing unit
121 turbo coder
122 data modulator
123 interleaver
13 MCS setting unit
15 serial parallel conversion unit (S/P)
16 multiplexing unit (MUX)
17 inverse fast Fourier transform unit (IFFT)
18 guard interval inserting unit
19 digital analog conversion unit (D/A)
20 radio parameter setting unit
23 reference signal generation unit
24, 25 multiplying unit
26 propagation state monitoring unit
202 analog digital converter (D/A)
203 selecting unit
204 guard interval removing unit
205, 207 multiplying unit
206 fast Fourier transform unit (FFT)
208 demultiplexing unit (DeMUX)
209 reference signal restoring unit
210, 212, 213 multiplying units
211 selecting unit
214 channel estimation unit
216 demodulation unit

PREFERRED EMBODIMENTS FOR CARRYING OUT THE INVENTION

Although the present invention is explained by classifying it into embodiments for the sake of convenience of explanation, classification into each embodiment is not essential in the present invention, and equal to or more than two embodiments may be used as necessary. While specific numerical value examples are used in explanation to facilitate understanding of the present invention, such numerical values are merely examples, so that any appropriate value may be used unless specified otherwise.

First Embodiment

Figure 5:
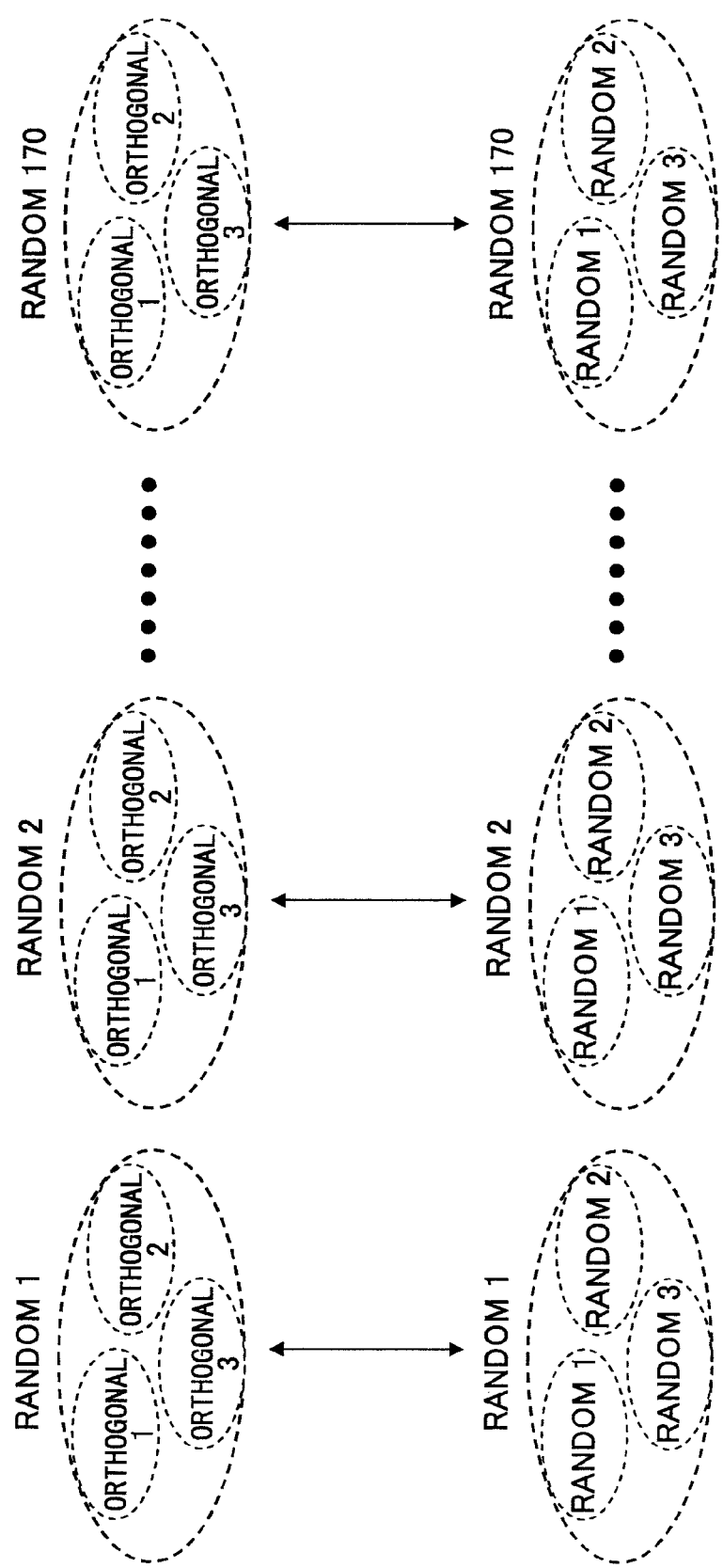
FIG. 5 is a diagram for explaining code sequences used for the reference signal in the first embodiment.

FIG. 5 shows code sequences used for the reference signal in the first embodiment. Like the conventional example, the upper side of the figure shows 170 random code sequences (random 1-170) which are different for each cell, and shows orthogonal code sequences (orthogonal 1-3) used in 3 sectors in the cell. The random code sequence may be a PN code sequence, for example. The orthogonal code sequence may be a CAZAC code sequence, for example. The orthogonal code sequence may be represented as a series of phase rotation factors, but, the orthogonal code sequence is not limited to it. But, from the viewpoint of calculating the orthogonal sequence easily, the phase rotation sequence is preferable.

The lower side of the figure shows options of code sequences that can be used in each cell. For example, in the leftmost cells in the figure, the reference signal may be configured by a first combination (upper side) of (random 1, orthogonal 1), (random 1, orthogonal 2) and (random 1, orthogonal 3), as well as by a second combination (lower side) of (random 1, random 1), (random 1, random 2) and (random 1, random 3) in addition to. In the upper side, each sector is identified by the orthogonal code sequence (orthogonal 1-3). On the other hand, each sector is identified by the random code sequence (random 1-3) in the case of lower side.

Since the random code sequence (random 1-170) for identifying each cell is a code for distinguishing among a large number of cells, the code length is relatively long. For example, the code may continue over a frame duration of 10 ms. The code sequence for identifying the cell may be called a long code. On the other hand, the orthogonal or random code sequence (orthogonal 1-3, random 1-3) for distinguishing among sectors can be relatively short such that it can identify 3 sectors. The code sequence for distinguishing the sector may be called a short code.

As mentioned above, in an area in which the cell radius is small and in an urban area and the like, the delay spread is relatively small, and phase variation between paths is small. Thus, orthogonality among codes can be easily maintained. Therefore, it is preferable to form the reference signal using the codes shown in the upper side. On the other hand, the delay spread becomes large in the area in which the cell radius is large, in a suburban area, and in a basin and the like. In this case, amplitude and phase vary relatively largely among paths due to frequency selective fading. Thus, even though the orthogonal code is used, orthogonality may be easily collapsed. However, in the case of the random code sequence, randomness is easily maintained even if there is fading, so that it can be expected that the effect of fading is dispersed. Therefore, in such a case, it is preferable to distinguish among sectors using the random code sequence as shown in the lower side. In the present embodiment, each base station changes code sequences that form the reference signal between the upper side and the lower side according to radio propagation states of the cell, based on the above-mentioned principle.

Figure 6:
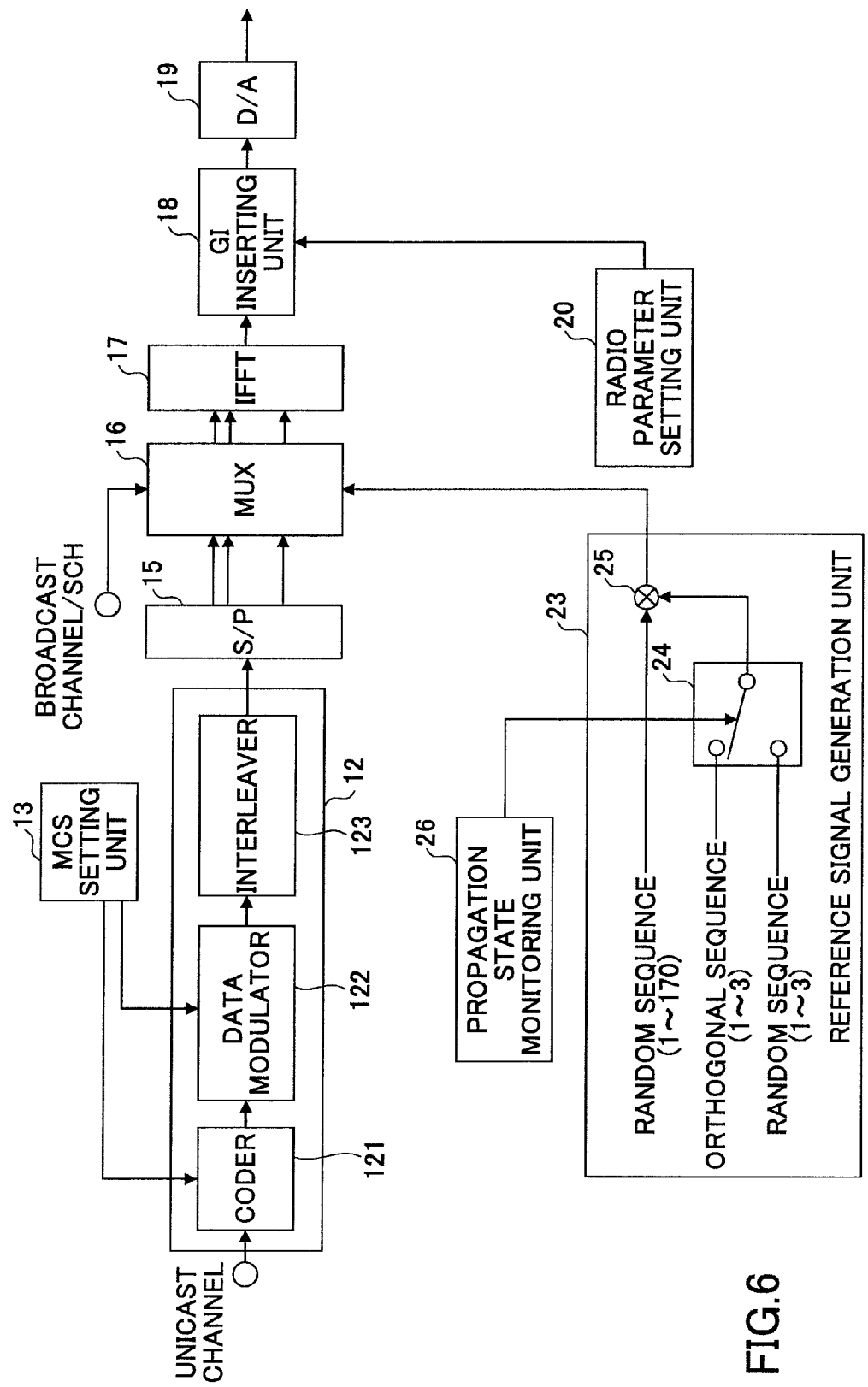
FIG. 6 is a partial block diagram of a base station used in the first embodiment.

FIG. 6 shows a base station used in the first embodiment of the present invention. FIG. 6 shows a unicast data processing unit 12, a MCS setting unit 13, a serial parallel conversion unit (S/P) 15, a multiplexing unit (MUX) 16, an inverse fast Fourier transform (IFFT) unit 17, a guard interval inserting unit 18, a digital analog conversion unit (D/A) 19, a radio parameter setting unit 20, a reference signal generation unit 23, and a propagation state monitoring unit 26. The unicast data processing unit 12 includes a turbo coder 121, a data modulator 122, and an interleaver 123. The reference signal generation unit 23 includes a selector 24 and a multiplier 25.

The unicast data processing unit 12 performs processing on channels to individual particular users.

The coder 121 performs coding for enhancing error tolerance of the unicast channel. Coding may be performed by various methods known in this technical field such as convolution coding and turbo coding and the like. In the present embodiment, adaptive modulation and coding (AMC) control is performed for the unicast channel, so that the channel coding rate is adaptively changed according to an instruction from the MCS setting unit 13.

The data modulator 122 performs data modulation on the unicast channel using a proper modulation scheme such as QPSK, 16 QAM, 64 QAM and the like. In the present embodiment, AMC control is performed for the unicast channel, and the modulation scheme is adaptively changed according to an instruction from the MCS setting unit 13.

The interleaver 123 permutes the order of data included in the unicast data according to a predetermined pattern.

Although FIG. 6 does not show process elements for other channels (such as control channel and MBMS channel, and the like), processing similar to that of the processing unit 12 is performed for the other channels. AMC control may be performed or may not be performed for the control channel and the like.

The MCS setting unit 13 provides instructions to each process component to change the combination of the modulation scheme and the coding rate used for the unicast channel as necessary. The combination of the modulation scheme and the coding rate is specified by a number (MCS number) indicating the contents of the combination.

The serial parallel conversion unit (S/P) 15 converts a serial signal sequence (stream) to parallel signal sequences. The number of the parallel signal sequences may be determined according to the number of subcarriers.

The multiplexing unit (MUX) 16 multiplexes a plurality of data sequences, the reference signal for unicast, a broadcast channel and the like. The multiplexing may be performed using any scheme of time multiplexing, frequency multiplexing, or time and frequency multiplexing.

The inverse fast Fourier transform unit (IFFT) 17 performs inverse fast Fourier transform on a signal input to it so as to perform modulation of the OFDM scheme.

The guard interval insertion unit 18 adds a guard interval (GI) or a cyclic prefix (CP) to a symbol modulated by the OFDM scheme so as to generate a transmission symbol. As is well known, the guard interval is generated by copying a series of data including head data of a symbol to be transmitted, and the transmission symbol is generated by adding the copied data to the end of the symbol. Or, the guard interval is generated by copying a series of data including end data of a symbol to be transmitted, and the transmission symbol is generated by adding the copied data to the head of the symbol.

The digital analog conversion unit (D/A) 19 converts the baseband digital signal into an analog signal.

The radio parameter setting unit 20 sets a radio parameter used for communication. The radio parameter (group) includes information for defining a format of the symbol of the OFDM scheme, and may include a group of pieces of information for specifying values of duration $T_{GI}$ of the guard interval part, duration of the effective symbol part, a ratio of the guard interval part in one symbol, subcarrier interval $\Delta f$ and the like. By the way, the duration of the effective symbol part is equal to an inverse $1/\Delta f$ the subcarrier interval.

The radio parameter setting unit 20 sets a proper radio parameter group according to communication state or according to an instruction from other apparatus. For example, the radio parameter setting unit 20 may choose radio parameter groups depending on whether the transmission subject is the unicast channel or the MBMS channel. For example, a radio parameter group defining a shorter duration as the guard interval part may be used for the unicast channel, and a radio parameter group defining a longer duration as the guard interval part may be used for the MBMS channel. Or, the radio parameter group may be changed according to the radio propagation state. For example, a short guard interval part may be used in an environment in which delay spread is small, and a long guard interval part may be used in an environment in which delay spread is large. The radio parameter setting unit 20 may derive a proper radio parameter group by calculating it each time when it is needed, or the radio parameter setting unit 20 may store a plurality of combinations of radio parameter groups in a memory so as to select one of them as necessary. As described later, the length of the guard interval part may indicate a configuration method of the reference signal.

The reference signal generation unit 23 multiplies a random code sequence (random 1-170) which is a first sequencer by a second sequence using the multiplier 25, and outputs a reference signal. The second sequence is an orthogonal code sequence (orthogonal 1-3) or a random code sequence (random 1-3), and is properly selected by the selecting part 24.

The propagation state monitoring unit 26 monitors the radio propagation state, and determines whether the reference signal of the own cell should be set as one shown in the upper side in FIG. 5 or set as one shown in the lower side based on the monitoring result. The determination result is provided to the selecting unit 24 in the reference signal generation unit 23 as an instruction signal. In addition, the determination result is also reported to the user apparatus. The result may be reported to the user apparatus by using any proper method. For example, the reporting may be performed using a synchronization channel. More particularly, the reporting may be performed using a secondary synchronization channel (S-SCH). Or, the reporting of the determination result may be performed using a broadcast channel (BCH). Further, the length of the guard interval may be associated with the determination result.

Figure 7:
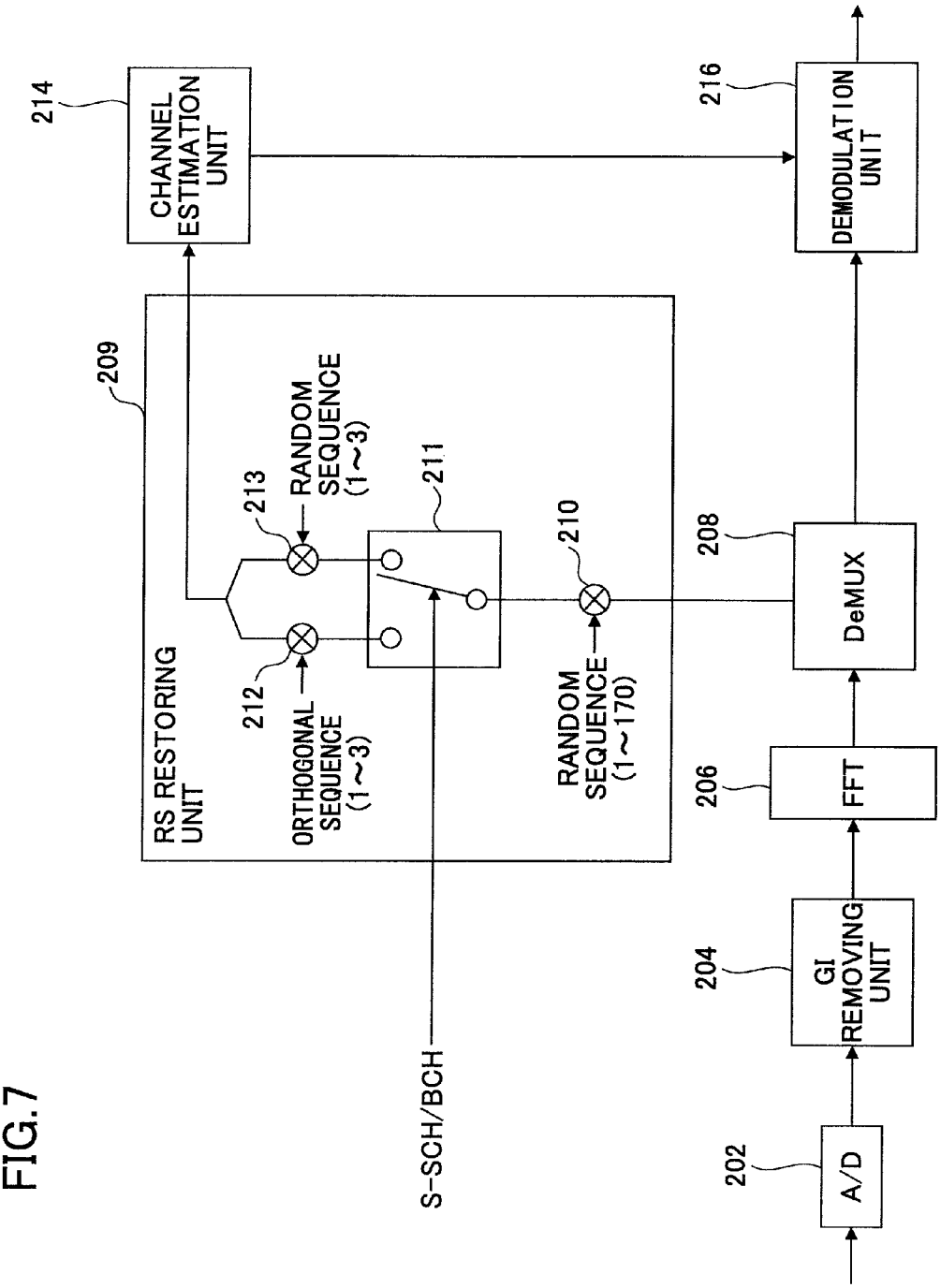
FIG. 7 shows a user apparatus used in the first embodiment.

FIG. 7 shows a user apparatus used in the present embodiment. The user apparatus is a mobile terminal typically, but it may be a fixed terminal. FIG. 7 shows an analog digital converter (D/A) 202, a guard interval removing unit 204, a fast Fourier transform unit (FFT) 206, a demultiplexing unit (DeMUX) 208, a reference signal restoring unit (RS restoring unit) 209, multiplying units 210, 212 and 213, a channel estimation unit 214 and a demodulation unit 216.

The analog digital converter (D/A) 202 converts a received baseband analog signal into a digital signal.

The guard interval removing unit 204 removes a guard interval from the received symbol to obtain an effective symbol part.

The fast Fourier transform unit (FFT) 206 performs fast Fourier transform on the input signal to perform demodulation of the OFDM scheme.

The demultiplexing unit (DeMUX) 208 separates the reference signal and the data signal (user data or control data) from the received signal.

The RS restoring unit 209 restores the reference signal included in the received signal. The multiplying unit 210 multiplies the reference signal by the random code sequence (random 1-170) for distinguishing among cells. The selecting unit 211 switches an output destination of a signal input to it according to an instruction from the base station. The multiplying unit 212 multiplies the reference signal by the orthogonal code sequence (orthogonal 1-3) for distinguishing among sectors, and the multiplying unit 213 multiplies the reference signal by the random code sequence (random 1-3) for distinguishing among sectors.

As mentioned above, the configuration method of the reference signal is determined in the base station, and the determined information is reported to the user apparatus. The information may be reported to the user apparatus by any proper method. In the example shown in the figure, the reporting is performed by the secondary synchronization channel (S-SCH) or by the broadcast channel (BCH). However, instead of that, or in addition to that, the length of the guard interval may be associated with the determination result. When the information is reported by S-SCH or BCH, the configuration method of the reference signal is explicitly indicated by a particular bit included in S-SCH or BCH. Thus, it is preferable to use the channels for reporting the information from the viewpoint of reporting the information easily and with reliability. Also, it is preferable to associate the configuration of the reference signal with the length of the guard interval part in that it becomes unnecessary to reserve additional bits in S-SCH or BCH or the like. This means that it is not necessary to change the base station apparatus and the user apparatus for reporting the configuration method of the reference signal.

The channel estimation unit 214 performs channel estimation based on the reference signal so as to determine how channel compensation should be applied to the received data signal.

The demodulation unit 216 compensates for the data signal based on the channel estimation result to restore the data signal which was transmitted and received.

In the present embodiment, since the configuration method of the reference signal is changed as necessary according to the radio propagation state, the present embodiment is preferable in that the quality of the reference signal can be enhanced irrespective of the size of the delay spread.

Second Embodiment

Although the same number of sequences or codes are prepared in the upper side and the lower side in FIG. 5, this is not essential for the present invention. The number of codes in the lower side may be less than the number of codes in the upper side. Because, in a situation where the code of the lower side is used, the delay spread in the multipath propagation environment is considerably large, and, it is hard to consider that delay spread becomes considerably large in the whole service area in which 170×3 codes are prepared. In reality, in many cases, the ratio of the case in which the delay spread becomes large can be estimated to be about 1% of the whole service area. In the second embodiment of the present invention, a combination of a less number of codes are prepared compared to the first embodiment as a preparation of the situation in which delay spread is large.

Figure 8:
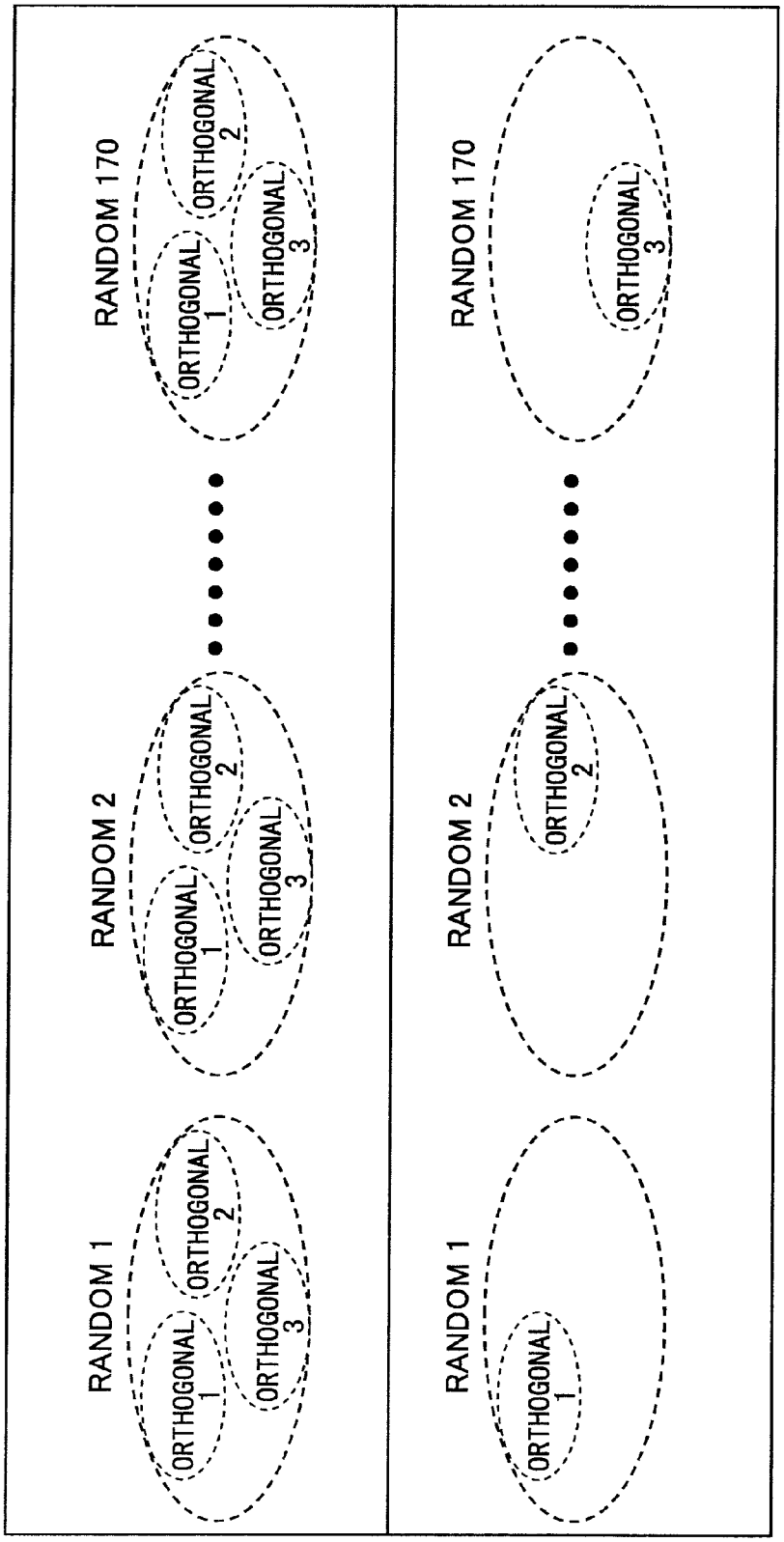
FIG. 8 is a diagram for explaining code sequences used for the reference signal in the second embodiment.

FIG. 8 shows code sequences used for the reference signal in the present embodiment. The upper side is the same as the upper side of FIG. 5. In the lower side of FIG. 8, only one short code (orthogonal sequence) is associated with one long code (random code sequence). Therefore, only 170 kinds of reference signals can be prepared. In each cell shown in the upper side, the reference signal may be configured according to any combination of three in the lower side according to the radio propagation state. For example, in the cell shown at the leftmost side of the upper side (random 1, orthogonal 1-3), the reference signal may be configured using a combination of (random 1, orthogonal 1), (random 2, orthogonal 2) and (random 3, orthogonal 3) in the lower side. From the viewpoint of setting the number of prepared reference signals to be the same between the upper side and the lower side, it can be considered to repeatedly use the lower side reference signal in places which are geographically apart from each other. Or, on the other hand, the number of long codes in the lower side may be smaller than that in the upper side.

Figure 9:
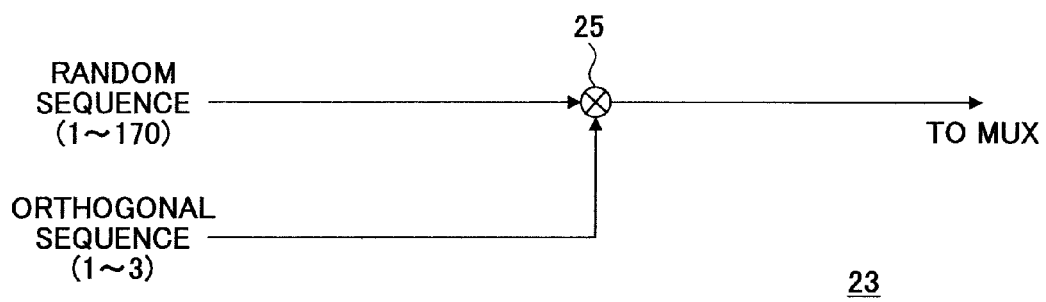
FIG. 9 is a diagram showing the reference signal generation unit of the base station used in the second embodiment.
Figure 10:
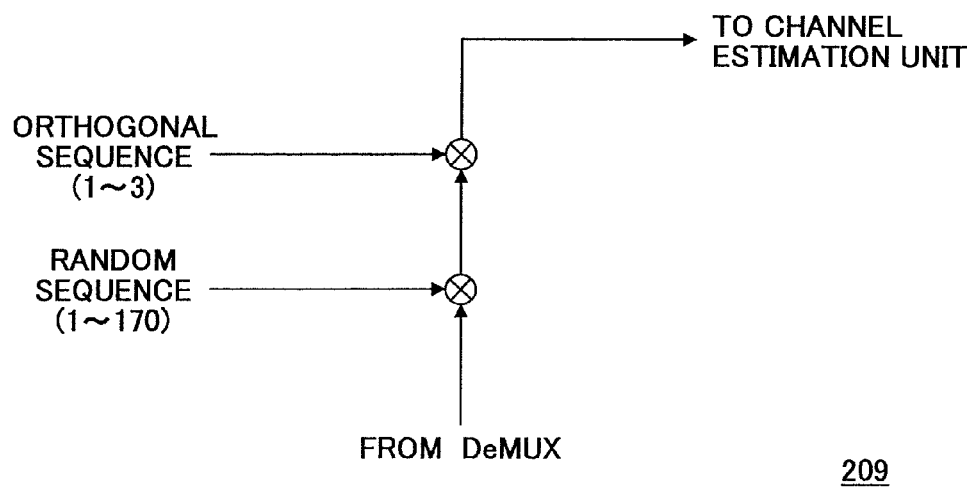
FIG. 10 is a diagram showing the reference signal restoring unit of the user apparatus used in the second embodiment.

FIG. 9 shows the reference signal generation unit 23 of the base station used in the second embodiment. FIG. 10 shows the reference signal restoring unit 209 of the user apparatus used in the second embodiment. Even when the configuration method of the reference signal changes according to the size of the delay spread, the code sequence to be used is not changed, so that the random code sequence (random 1-170) is multiplied by the orthogonal code sequence (orthogonal 1-3) and the result is output.

In the present embodiment, there is no code newly appearing in the lower side, so that only the same kinds of code sequences are used in the upper side and in the lower side. In the lower side, different from the upper side, one random long code is associated with only one orthogonal sequence (short code). The second embodiment is advantageous compared with the first embodiment in that it is not necessary to provide any new code sequence.

Third Embodiment

Figure 11:
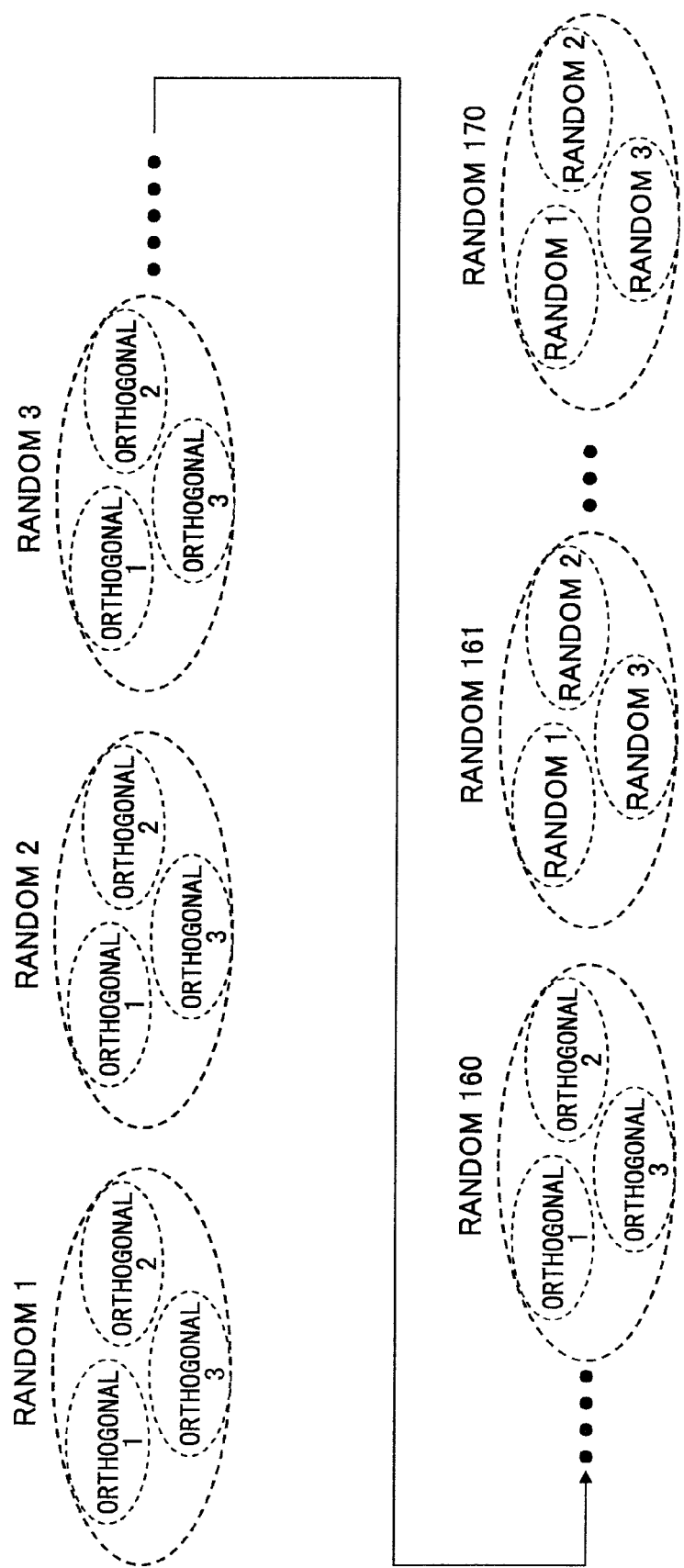
FIG. 11 is a diagram for explaining code sequences used for the reference signal in the third embodiment.

FIG. 11 shows code sequences used for the reference signal in the third embodiment of the present invention. In the first and the second embodiments, the configuration method of the reference signal can be changed according to the length of the delay spread in any cell of the 170 cells. However, the size of the delay spread does not change so frequently, and also it may not change regionally. The third embodiment of the present invention addresses such cases.

In the example shown in the figure, for the 1st to 160-th cells (random 1-160), the reference signal is formed by the random code sequence of the long code and the orthogonal sequence of the short code. In these areas, it is assumed that the delay spread is relatively small. As to the 161-th to 170-th cells (random 161-170), the reference signal is configured using the random code sequence of the long code and the random code sequence of the short code. In these areas, it is assumed that the delay spread is relatively large.

Figure 12:
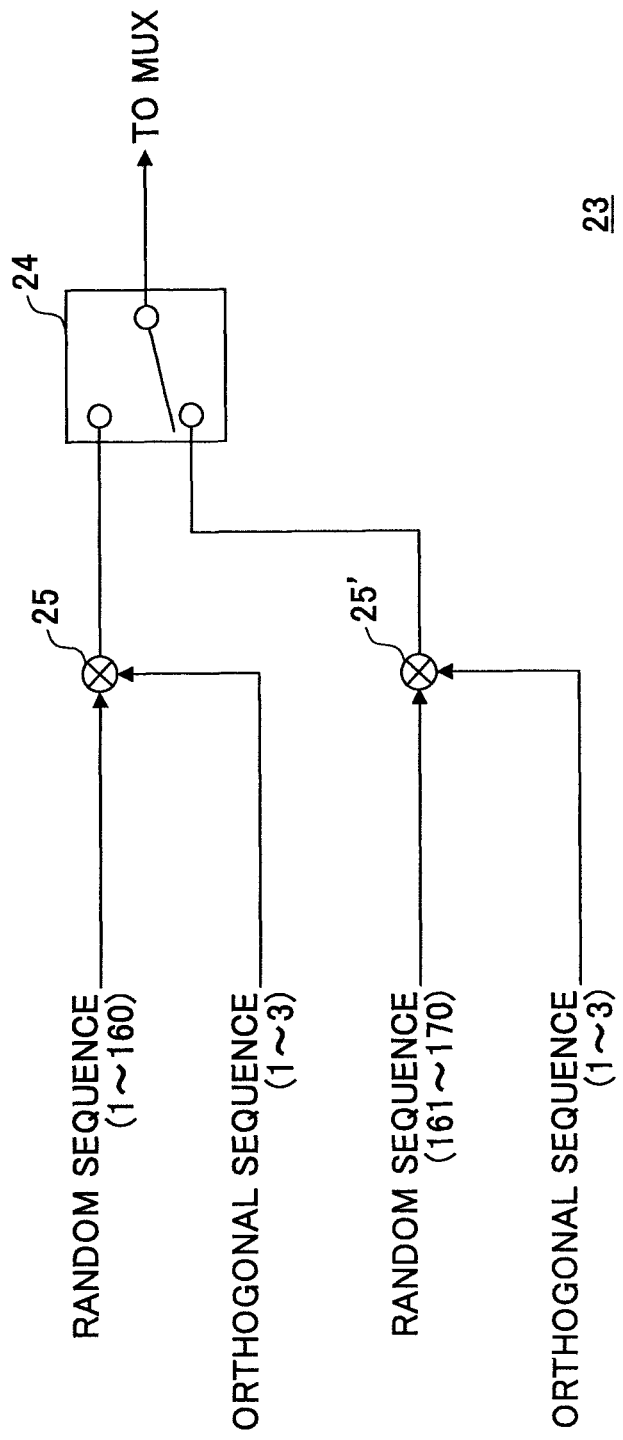
FIG. 12 is a diagram showing the reference signal generation unit of the base station used in the third embodiment.

FIG. 12 shows the reference signal generation unit 23 of the base station used in the third embodiment. The selecting unit 24 selects an input. But, when the input is once selected, the input is fixed after that. For the 1st to 160-th cells, the multiplication of the random code sequence (random 1-160) and the orthogonal code sequence (orthogonal 1-3) is selected in a fixed manner. For the 161-th to 170-th cells, multiplication of the random long code (random 161-170) and the random short code (random 1-3) is selected in a fixed manner.

Figure 13:
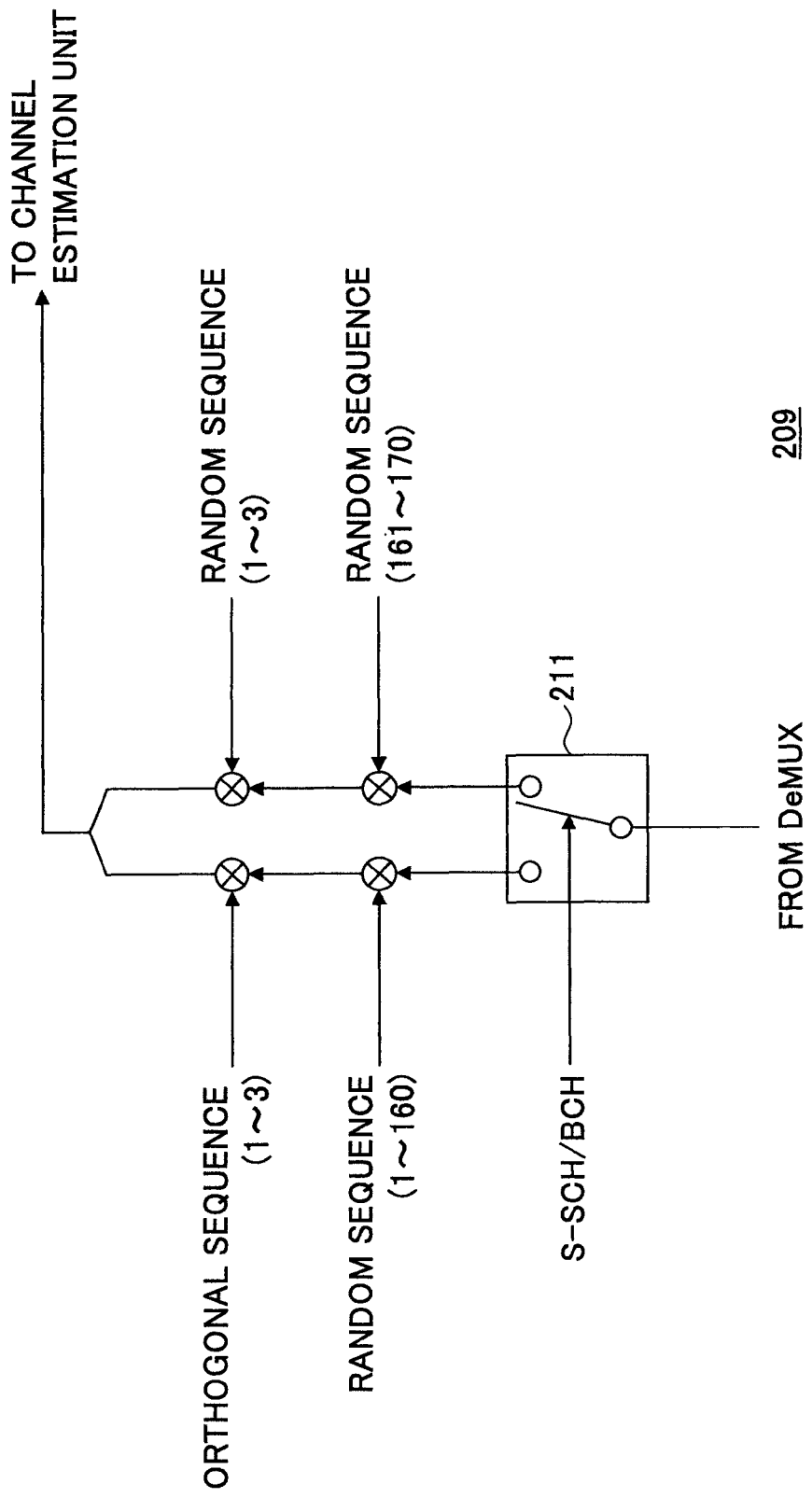
FIG. 13 is a diagram showing the reference signal restoring unit of the user apparatus used in the third embodiment.

FIG. 13 shows the reference signal restoring unit 209 of the user apparatus used in the third embodiment. The selecting unit 211 also outputs the input to an output. But, when the output is once selected, the output is fixed after that as long as the user apparatus resides in the cell. For the 1st to 160-th cells, the multiplication of the random code sequence (random 1-160) and the orthogonal code sequence (orthogonal 1-3) is selected in a fixed manner. For the 161-th to 170-th cells, multiplication of the random long code (random 161-170) and the random short code (random 1-3) is selected in a fixed manner.

In the third embodiment of the present invention, the configuration method of the reference signal is fixed for each cell. Thus, this embodiment is preferable for simplifying the operation and configuration of the base station and the user apparatus.

Fourth Embodiment

In the third embodiment, the configuration method of the reference signal is fixed in each cell. On the other hand, in the fourth embodiment of the present invention, the configuration method of the reference signal is fixed in cells excluding a part of cells, and in the part of the cells, the configuration method of the reference signal is selected variably. The fourth embodiment is common to the first and the second embodiments in that the configuration method can be changed in a part of the cells, and the fourth embodiment is common to the third embodiment in that the configuration method is fixed in a part of the cells. Thus, the fourth embodiment can be said to be a combination of the first to third embodiments.

Figure 14:
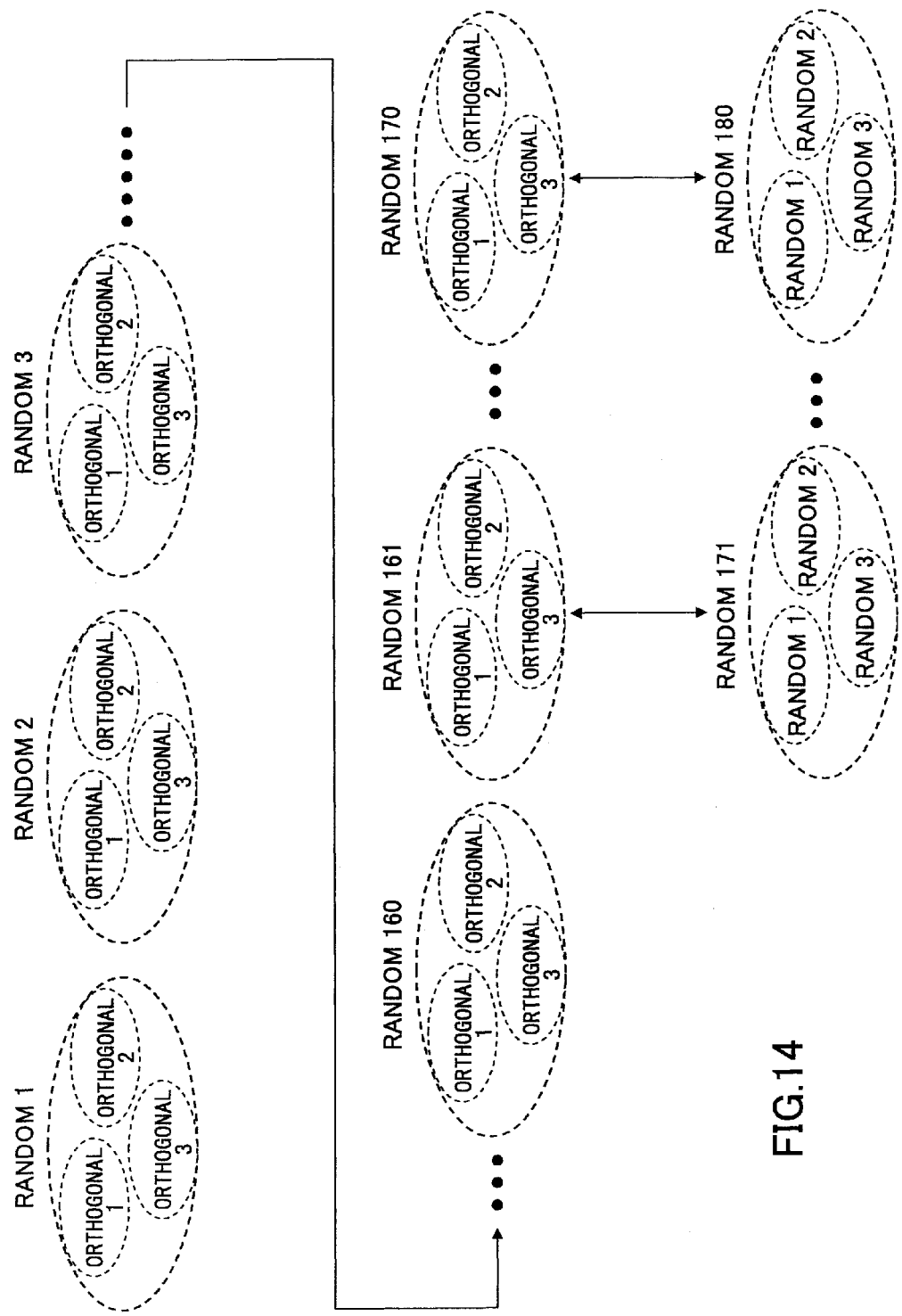
FIG. 14 is a diagram for explaining code sequences used for the reference signal in the fourth embodiment.

FIG. 14 shows code sequences used for the reference signal in the fourth embodiment. In the example shown in the figure, the reference signal is formed by the random code sequence of the long code and the orthogonal sequence of the short code for the 1st to 160-th cells (random 1-160). For the 161-th to 170-th cells (random 161-170), the reference signal is formed by the random code sequence of the long code and the random code sequence of the short code. In the example shown in the figure, the random long codes used for the 10 cells are random 171-180 which may be different from the random 1-170. As a matter of course, instead of the random long codes 171-180, long codes 161-170 may be used.

Figure 15:
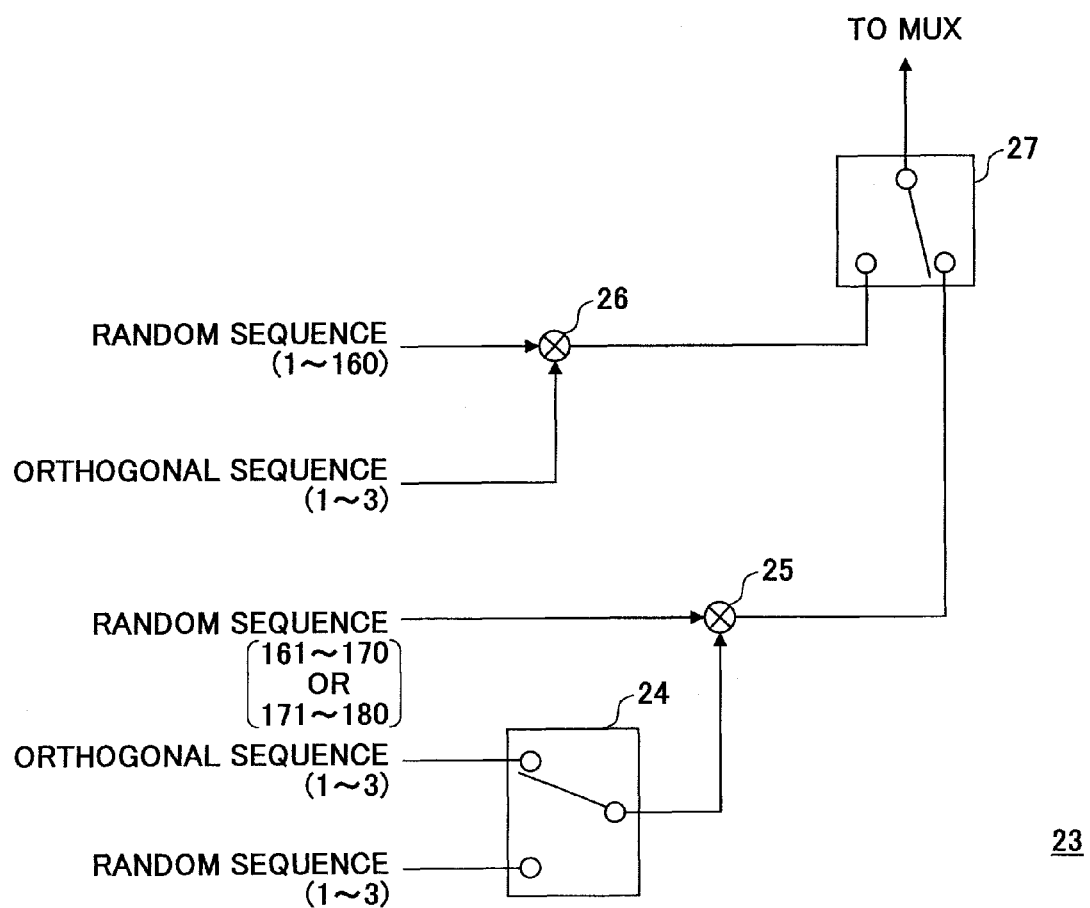
FIG. 15 is a diagram showing the reference signal generation unit of the base station used in the fourth embodiment.

FIG. 15 shows the reference signal generation unit 23 of the base station used in the fourth embodiment. The random long code is multiplied by the orthogonal code sequence, so that the result is provided to one input of the selecting unit 27. Similarly to the selecting unit 24 of FIG. 6, the orthogonal code sequence or the random code sequence of the short code is selected, so that it is multiplied by the random long code, and the result is provided to another input of the selecting unit 27. The selecting unit 27 performs selection depending on whether the own cell is a cell in which delay spread is large.

FIG. 16 shows the reference signal restoring unit 209 of the user apparatus used in the fourth embodiment. Similarly to FIG. 13, the selecting unit 203 guides the input signal to an output. If the residing cell of the user apparatus is a cell in which the reference signal cannot be configured variably, the received signal is multiplied by the random long code (random 1-160) and the orthogonal code sequence (orthogonal 1-3), so that the reference signal is restored. If the residing cell of the user apparatus is a cell in which the reference signal can be configured variably, the received signal is multiplied by the random long code (random 161-170 or 171-180) and the short code, so that the reference signal is restored. The short code is set to be the orthogonal code sequence or the random code sequence depending on the size of the delay spread.

As described above, while the present invention is described with reference to specific embodiments, the respective embodiments are merely exemplary, so that a skilled person will understand variations, modifications, alternatives, and replacements. While specific numerical value examples are used to facilitate understanding of the present invention, such numerical values are merely examples, so that any appropriate value may be used unless specified otherwise. Classification into each embodiment is not essential in the present invention, and equal to or more than two embodiments may be used as necessary. For convenience of explanation, while the apparatus according to the embodiments of the present invention is explained using functional block diagrams, such an apparatus as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese patent application No. 2007-139719, filed in the JPO on May 25, 2007, and the entire contents of the Japanese patent application No. 2007-139719 is incorporated herein by reference.

The invention claimed is:

1. A base station apparatus for use in a mobile communication system, comprising:
 a unit configured to generate a reference signal;
 a unit configured to generate a transmission symbol including the reference signal;
 a unit configured to transmit the transmission symbol for each sector; and
 a unit configured to monitor a radio propagation state,
 wherein the reference signal is generated by multiplying a first sequence formed by a non-orthogonal code sequence which is different at least between an adjacent cell and an own cell, by a second sequence, and
 wherein whether to form the second sequence by using an orthogonal code sequence which is different among sectors or by using a non-orthogonal code sequence is determined according to the radio propagation state.

2. The base station apparatus as claimed in claim 1, wherein a configuration method of the second sequence is reported to a user apparatus using a synchronization channel or a broadcast channel.

3. The base station apparatus as claimed in claim 1, wherein a configuration method of the second sequence is identified by a length of a cyclic prefix which is used for the transmission symbol.

4. A user apparatus for use in a mobile communication system, comprising:
 a unit configured to extract a reference signal from a received signal;
 a unit configured to multiply the reference signal by a first sequence formed by a non-orthogonal code sequence which is different at least between an adjacent cell and an own cell;
 a unit configured to multiply the reference signal by a second sequence; and
 a unit configured to perform channel estimation based on the reference signal,
 wherein any one of an orthogonal code sequence which is different among sectors and a non-orthogonal code sequence is set as the second sequence according to an instruction from a base station apparatus.

5. The user apparatus as claimed in claim 4, wherein the instruction from the base station apparatus is reported using a synchronization channel or a broadcast channel.

6. The user apparatus as claimed in claim 4, wherein the instruction from the base station apparatus is represented as a length of a cyclic prefix which is used for the received signal.

7. A method for use in a mobile communication system, comprising:
 a step in which a downlink reference signal is generated;
 a step in which a transmission symbol including the reference signal is generated; and
 a step in which the transmission symbol is transmitted for each sector,
 wherein the reference signal is generated by multiplying a first sequence formed by a non-orthogonal code sequence which is different at least between an adjacent cell and an own cell, by a second sequence, and
 wherein whether to form the second sequence by using an orthogonal code sequence which is different among sectors or by using a non-orthogonal code sequence is determined according to a radio propagation state.

8. A mobile communication system including a plurality of base station apparatuses, each base station apparatus comprising:
 a unit configured to generate a reference signal;
 a unit configured to generate a transmission symbol including the reference signal; and
 a unit configured to transmit the transmission symbol for each sector,
 wherein, in one or more of a plurality of first base station apparatuses, the reference signal is generated by multiplying a first sequence formed by a non-orthogonal code sequence which is different at least between an adjacent cell and an own cell, by a second sequence formed by an orthogonal code sequence different among sectors, and wherein, in one or more of a plurality of second base station apparatuses different from the plurality of first base station apparatuses, the reference signal is generated by multiplying a first sequence formed by a non-orthogonal code sequence which is different at least between an adjacent cell and an own cell, by a second sequence formed by a non-orthogonal code sequence different among sectors.

9. The mobile communication system as claimed in claim 8, wherein a configuration method of the second sequence is reported to a user apparatus using a synchronization channel or a broadcast channel.

10. The mobile communication system as claimed in claim 8, wherein a configuration method of the second sequence is identified by a length of a cyclic prefix which is used for the transmission symbol.

11. A user apparatus for use in a mobile communication system, comprising:
  a demultiplexing unit configured to separate a reference signal from a received signal;
  a unit configured to multiply the signal separated using the demultiplexing unit by a first sequence formed by a non-orthogonal code sequence which is different at least between an adjacent cell and an own cell;
  a unit configured to multiply the signal separated using the demultiplexing unit by a second sequence; and
  a unit configured to perform channel estimation based on the reference signal,
  wherein, based on an instruction from a base station apparatus, the user apparatus despreads the reference signal by using the first sequence belonging to a predetermined sequence group and the second sequence formed by an orthogonal code sequence which is different among sectors, or
  the user apparatus despreads the reference signal by using the first sequence belonging to another predetermined sequence group and the second sequence formed by a non-orthogonal code sequence which is different among sectors.

12. The user apparatus as claimed in claim 11, wherein the instruction from the base station apparatus is reported using a synchronization channel or a broadcast channel.

13. The user apparatus as claimed in claim 11, wherein the instruction from the base station apparatus is represented as a length of a cyclic prefix which is used for the received signal.

14. A method for use in a mobile communication system, comprising:
  a step in which a downlink reference signal is generated;
  a step in which a transmission symbol including the reference signal is generated; and
  a step in which the transmission symbol is transmitted for each sector,
  wherein, in one or more of a plurality of first cells, the reference signal is generated by multiplying a first sequence formed by a non-orthogonal code sequence which is different at least between an adjacent cell and an own cell, by a second sequence formed by an orthogonal code sequence which is different among sectors, and
  wherein, in one or more of a plurality of second cells different from the plurality of first cells, the reference signal is generated by multiplying a first sequence formed by a non-orthogonal code sequence which is different at least between an adjacent cell and an own cell, by a second sequence formed by a non-orthogonal code sequence which is different among sectors.

15. A mobile communication system including a plurality of base station apparatuses, each base station apparatus comprising:
  a unit configured to generate a reference signal;
  a unit configured to generate a transmission symbol including the reference signal; and
  a unit configured to transmit the transmission symbol for each sector,
  wherein, in one or more of a plurality of first base station apparatuses, the reference signal is generated by multiplying a first sequence formed by a non-orthogonal code sequence which is different at least between an adjacent cell and an own cell, by a second sequence formed by an orthogonal code sequence which is different among sectors, and
  wherein, in one or more of a plurality of second base station apparatuses different from the plurality of first base station apparatuses, the reference signal is generated by multiplying a first sequence formed by a non-orthogonal code sequence which is different at least between an adjacent cell and an own cell, by a second sequence, wherein whether to form the second sequence by using an orthogonal code sequence which is different among sectors or by using a non-orthogonal code sequence is determined according to a radio propagation state.

16. The mobile communication system as claimed in claim 15, wherein a configuration method of the second sequence is reported to a user apparatus using a synchronization channel or a broadcast channel.

17. The mobile communication system as claimed in claim 15, wherein a configuration method of the second sequence is identified by a length of a cyclic prefix which is used for the transmission symbol.

18. A user apparatus for use in a mobile communication system, comprising:
  a unit configured to extract a reference signal from a received signal;
  a unit configured to multiply the reference signal by a first sequence formed by a non-orthogonal code sequence which is different at least between an adjacent cell and an own cell;
  a unit configured to multiply the reference signal by a second sequence; and
  a unit configured to perform channel estimation based on the reference signal,
  wherein, based on an instruction from a base station apparatus, the user apparatus despreads the reference signal by using the first sequence belonging to a predetermined sequence group and an orthogonal code sequence which is different among sectors, or
  the user apparatus despreads the reference signal by using the first sequence belonging to another predetermined sequence group and the second sequence, wherein the second sequence is set to be an orthogonal code sequence which is different among sectors or a non-orthogonal code sequence based on the instruction from the base station apparatus.

19. The user apparatus as claimed in claim 18, wherein the instruction from the base station apparatus is reported using a synchronization channel or a broadcast channel.

20. The user apparatus as claimed in claim 18, wherein the instruction from the base station apparatus is represented as a length of a cyclic prefix which is used for the received signal.

21. A method for use in a mobile communication system, comprising:
- a step in which a downlink reference signal is generated;
- a step in which a transmission symbol including the reference signal is generated; and
- a step in which the transmission symbol is transmitted for each sector,
- wherein, in one or more of a plurality of first cells, the reference signal is generated by multiplying a first sequence formed by a non-orthogonal code sequence which is different at least between an adjacent cell and an own cell, by a second sequence formed by an orthogonal code sequence which is different among sectors, and
- wherein, in one or more of a plurality of second cells different from the plurality of first cells, the reference signal is generated by multiplying a first sequence formed by a non-orthogonal code sequence which is different at least between an adjacent cell and an own cell, by a second sequence, wherein whether to form the second sequence by using an orthogonal code sequence which is different among sectors or by using a non-orthogonal code sequence is determined according to a radio propagation state.

* * * * *